US012679446B2

(12) United States Patent
Yoshimura et al.

(10) Patent No.: US 12,679,446 B2
(45) Date of Patent: Jul. 14, 2026

(54) DRIVING ASSISTANCE DEVICE, DRIVING ASSISTANCE METHOD, AND STORAGE MEDIUM

(71) Applicant: HONDA MOTOR CO., LTD., Tokyo (JP)

(72) Inventors: Misako Yoshimura, Wako (JP); Gakuyo Fujimoto, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 100 days.

(21) Appl. No.: 18/373,300

(22) Filed: Sep. 27, 2023

(65) Prior Publication Data

US 2024/0109583 A1 Apr. 4, 2024

(30) Foreign Application Priority Data

Sep. 30, 2022 (JP) ................................. 2022-157690

(51) Int. Cl.
*B62D 5/04* (2006.01)
*B60W 10/20* (2006.01)
(Continued)

(52) U.S. Cl.
CPC ........... *B62D 5/0463* (2013.01); *B60W 10/20* (2013.01); *B60W 30/09* (2013.01);
(Continued)

(58) Field of Classification Search
CPC .. B60W 10/20; B60W 30/09; B60W 30/0956; B60W 50/14; B60W 2710/202; B62D 5/0463; B62D 15/0265
See application file for complete search history.

(56) References Cited

U.S. PATENT DOCUMENTS

| | | | |
|---|---|---|---|
| 12,139,197 B1 * | 11/2024 | Osajima ................... | B62D 5/04 |
| 2005/0270145 A1 | 12/2005 | Kataoka et al. | |

(Continued)

FOREIGN PATENT DOCUMENTS

| | | |
|---|---|---|
| CN | 102396008 | 3/2012 |
| CN | 104190806 | 1/2015 |

(Continued)

OTHER PUBLICATIONS

Japanese Office Action for Japanese Patent Application No. 2022-157690 mailed Aug. 26, 2025.

(Continued)

*Primary Examiner* — Dale W Hilgendorf
*Assistant Examiner* — Hana Lee
(74) *Attorney, Agent, or Firm* — Amin, Turocy & Watson, LLP

(57) ABSTRACT

A driving assistance device includes a storage medium configured to store computer-readable instructions, and a processor that is connected to the storage medium, in which the processor executes the computer-readable instructions to determine to prompt a driver of a mobile object to avoid contact with an object detected by an object detection device whose detection range is at least on a traveling direction side of the mobile object according to steering, and a steering direction for avoiding contact with the object, and when it is determined to prompt the driver of the mobile object to avoid contact with the object according to steering, cause an actuator capable of outputting force to a steering operator to execute outputting, first, a force to reach a first target force in the same direction as the steering direction in a first period to maintain the state, and causing, then, a force output in a second period longer than the first period to reach zero.

7 Claims, 3 Drawing Sheets

(51) Int. Cl.

| | |
|---|---|
| *B60W 30/09* | (2012.01) |
| *B60W 30/095* | (2012.01) |
| *B60W 50/14* | (2020.01) |
| *B62D 15/02* | (2006.01) |

(52) U.S. Cl.

CPC ........ *B60W 30/0956* (2013.01); *B60W 50/14* (2013.01); *B62D 15/0265* (2013.01); *B60W 2710/202* (2013.01)

(56) References Cited

U.S. PATENT DOCUMENTS

| | | | |
|---|---|---|---|
| 2009/0009305 A1 | 1/2009 | Kataoka et al. | |
| 2010/0004821 A1 | 1/2010 | Buerkle et al. | |
| 2012/0019375 A1* | 1/2012 | Kataoka | G08G 1/166 340/439 |
| 2015/0025745 A1 | 1/2015 | Tamura et al. | |
| 2018/0170370 A1* | 6/2018 | Kataoka | B60W 30/09 |
| 2018/0186372 A1* | 7/2018 | Shimizu | B62D 6/08 |
| 2020/0047749 A1* | 2/2020 | Morotomi | B60W 30/09 |
| 2022/0289174 A1* | 9/2022 | Hashimoto | B60W 60/0015 |

FOREIGN PATENT DOCUMENTS

| | | |
|---|---|---|
| CN | 110816525 | 2/2020 |
| JP | 2005-343303 | 12/2005 |
| JP | 2006-327497 | 12/2006 |
| JP | 2008-247328 | 10/2008 |
| JP | 2016-030551 | 3/2016 |
| JP | 2021-062804 | 4/2021 |
| JP | 2021-095021 | 6/2021 |

OTHER PUBLICATIONS

Chinese Office Action for Chinese Patent Application No. 202311215421.1 mailed May 13, 2026.

* cited by examiner

DRIVING ASSISTANCE DEVICE, DRIVING ASSISTANCE METHOD, AND STORAGE MEDIUM

CROSS-REFERENCE TO RELATED APPLICATION

Priority is claimed on Japanese Patent Application No. 2022-157690, filed Sep. 30, 2022, the content of which is incorporated herein by reference.

BACKGROUND

Field of the Invention

The present invention relates to a driving assistance device, a driving assistance method, and a storage medium.

Description of Related Art

Conventionally, there has been disclosed an invention of a contact avoidance assistance device for a vehicle that assists with avoidance of contact with a forward obstacle (Japanese Unexamined Patent Application, First Publication No. 2021-62804). This device is equipped with a steering actuator for steering the steering wheel of the vehicle, a steering device for steering the steering wheel according to an operation of the steering wheel, a relative position acquisition sensor for acquiring a position of the obstacle relative to the vehicle, a control device configured to determine whether driving operation assistance is necessary for contact avoidance on the basis of the relative position, and to execute steering control for controlling a steering amount of the steering actuator to avoid contact with the obstacle when it is determined that the driving operation assistance is necessary, and a gripping state detection sensor that detects a gripping state of the driver with respect to the steering wheel, the control device includes a normal mode and a limit mode as control modes for executing steering control, and steering control is selectively performed in the limit mode on the basis of the gripping state.

SUMMARY

In the conventional technology described above, notification control is performed so that a steering speed in the same direction as the steering direction in the steering control is higher than a steering speed in the direction opposite to the steering direction in the steering control. However, it is not clarified how much the steering speed needs to be increased specifically.

The present invention has been made in view of such circumstances, and an object thereof is to provide a driving assistance device, a driving assistance method, and a storage medium that can more effectively prompt a driver in steering to avoid an obstacle.

The driving assistance device, the driving assistance method, and the storage medium according to the present invention have adopted the following configurations.

(1): A driving assistance device according to one aspect of the present invention includes a storage medium configured to store computer-readable instructions, and a processor that is connected to the storage medium, in which the processor executes the computer-readable instructions to determine to prompt a driver of a mobile object to avoid contact with an object detected by an object detection device whose detection range is at least on a traveling direction side of the mobile object according to steering, and a steering direction for avoiding contact with the object, and when it is determined to prompt the driver of the mobile object to avoid contact with the object according to steering, cause an actuator capable of outputting a force to a steering operator to execute first outputting a force to reach a first target force in the same direction as the steering direction in a first period to maintain the state, and then causing a force output in a second period longer than the first period to reach zero.

(2): In the aspect of (1) described above, the first period may be a period of ¼ or less of a reciprocal of 5 hertz and ¼ or more of a reciprocal of 30 hertz, and the second period may be a period of ¼ or more of a reciprocal of 4 hertz.

(3): In the aspect of (1) to (2) described above, a steering device mounted on the mobile object may be a mechanical connection of the steering operator and a steering wheel, and the processor may cause the actuator to output a force to reach a second target force in a direction opposite to the steering direction in a third period longer than the first period to maintain the state after causing the force output by the actuator in the second period to reach zero, and then to cause a force output in a fourth period to reach zero.

(4): In the aspect of (3) described above, the processor may make an integrated value of a force output by the actuator in the same direction as the steering direction equal to an integrated value of a force output by the actuator in a direction opposite to the steering direction.

(5): In the aspect of (3) described above, the fourth period and the first period may be equal to each other.

(6): A driving assistance method according to another aspect of the present invention is a driving assistance method to be executed and includes determining to prompt a driver of a mobile object to avoid contact with an object detected by an object detection device whose detection range is at least on a traveling direction side of the mobile object according to steering, and a steering direction for avoiding contact with the object, and when it is determined to prompt the driver of the mobile object to avoid contact with the object according to steering, causing an actuator capable of outputting a force to a steering operator to execute first outputting a force to reach a first target force in the same direction as the steering direction in a first period to maintain the state, and then causing a force output in a second period longer than the first period to reach zero.

(7): A storage medium according to still another aspect of the present invention is a computer-readable non-transitory storage medium that has stored a program, in which the program causes a processor to execute determining to prompt a driver of a mobile object to avoid contact with an object detected by an object detection device whose detection range is at least on a traveling direction side of the mobile object according to steering, and a steering direction for avoiding contact with the object, and when it is determined to prompt the driver of the mobile object to avoid contact with the object according to steering, causing an actuator capable of outputting a force to a steering operator to execute first outputting a force to reach a first target force in the same direction as the steering direction in a first period to maintain the state, and then causing a force output in a second period longer than the first period to reach zero.

According to the aspects of (1) to (7), it is possible to more effectively prompt a driver in steering to avoid an obstacle.

DESCRIPTION OF EMBODIMENTS

Embodiments of a driving assistance device, a driving assistance method, and a storage medium of the present invention will be described with reference to the drawings. A driving assistance device is a device that assists with the driving of a mobile object. "Mobile object" refers to a structure that can be moved by its own drive mechanism, such as a vehicle, micromobility, an autonomous mobile robot, a ship, and a drone. In the following description, it is assumed that the mobile object is a vehicle that moves on the ground, and configurations and functions for making the vehicle move on the ground will be mainly described.

First Embodiment

Figure 1:
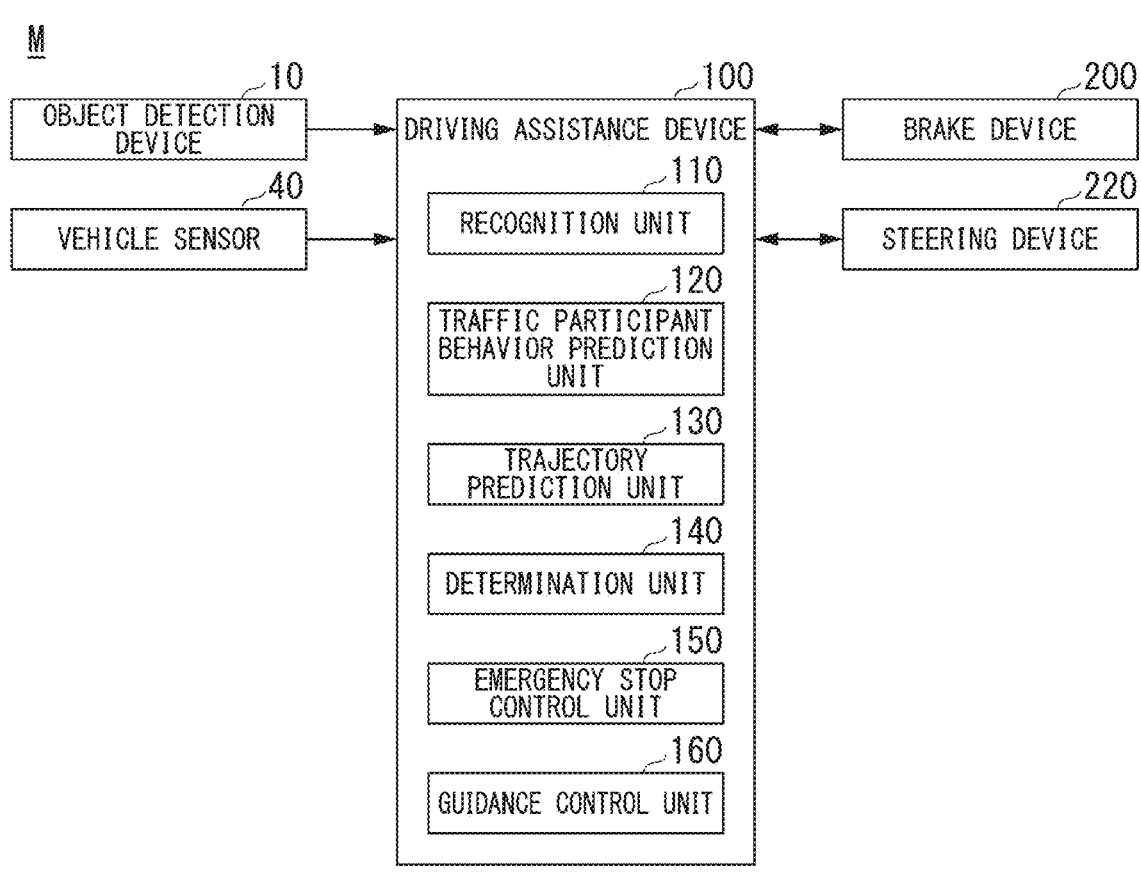
FIG. 1 is a configuration diagram centered on a driving assistance device according to a first embodiment.

FIG. 1 is a configuration diagram centered on a driving assistance device 100 according to a first embodiment. The driving assistance device 100 is mounted on a vehicle. In addition to the driving assistance device 100, this vehicle (hereinafter referred to as a vehicle M) is equipped with, for example, an object detection device 10, a vehicle sensor 40, a brake device 200, a steering device 220, and the like. Note that the configuration shown in FIG. 1 is merely an example, and a part of the configuration may be omitted, or another configuration may be added. Although the vehicle M is provided with driving force output devices such as an engine and a traveling motor, illustration and description thereof will be omitted.

The object detection device 10 includes, for example, some or all of a camera, a radar device, a light detection and ranging (LIDAR), a sensor fusion device, and the like. The object detection device 10 is a device for detecting an object within a detection range of at least the traveling direction side of the vehicle M. The camera is, for example, a digital camera using a solid-state imaging device such as a charge coupled device (CCD) or a complementary metal oxide semiconductor (CMOS). The camera is attached to an arbitrary place in the vehicle M. When a forward image is captured, the camera is attached to an upper part of the front windshield, a back surface of the windshield rear-view mirror, and the like. The camera periodically and repeatedly captures, for example, an image of a periphery of the vehicle M. The camera may be a stereo camera or a distance measuring sensor. The radar device radiates radio waves such as millimeter waves to the periphery of the vehicle M, and also detects at least a position (a distance and an orientation) of an object by detecting radio waves (reflected waves) reflected by the object. The radar device may detect the position and speed of an object in a frequency modulated continuous wave (FM-CW) method. The LIDAR irradiates the periphery of the host vehicle M with light (or electromagnetic waves with wavelengths close to that of light) and measures scattered light. The LIDAR detects a distance to a target on the basis of a time from light emission to light reception. The irradiated light is, for example, a pulsed laser beam. The sensor fusion device performs sensor fusion processing on results of detection by some or all of the camera, the radar device, and the LIDAR, and recognizes the position, type, speed, and the like of an object. Instead of the sensor fusion device, the object detection device 10 may include an image analysis device that exclusively performs a camera image analysis. This image analysis device may be a function of the driving assistance device 100. The object detection device 10 outputs a result of recognition to the driving assistance device 100.

The vehicle sensor 40 includes a vehicle speed sensor that detects a speed of the host vehicle M, an acceleration sensor that detects acceleration, a yaw rate sensor that detects an angular speed around a vertical axis, an azimuth sensor that detects a direction of the host vehicle M, and the like.

Before describing the driving assistance device 100, the brake device 200 and the steering device 220 will be described.

The brake device 200 includes, for example, a brake caliper, a cylinder that transmits a hydraulic pressure to the brake caliper, an electric motor that generates a hydraulic pressure in the cylinder, and a brake ECU. The brake ECU controls the electric motor according to information input from the driving assistance device 100 or information input from a driving operator (not shown) so that a brake torque corresponding to a braking operation is output to each wheel. The brake device 200 may have a mechanism that transmits the hydraulic pressure generated by operating a brake pedal to the cylinder via a master cylinder as a backup. The brake device 200 is not limited to the configuration described above, and may be an electronically controlled hydraulic brake device that transmits the hydraulic pressure of the master cylinder to the cylinder.

Figure 2:
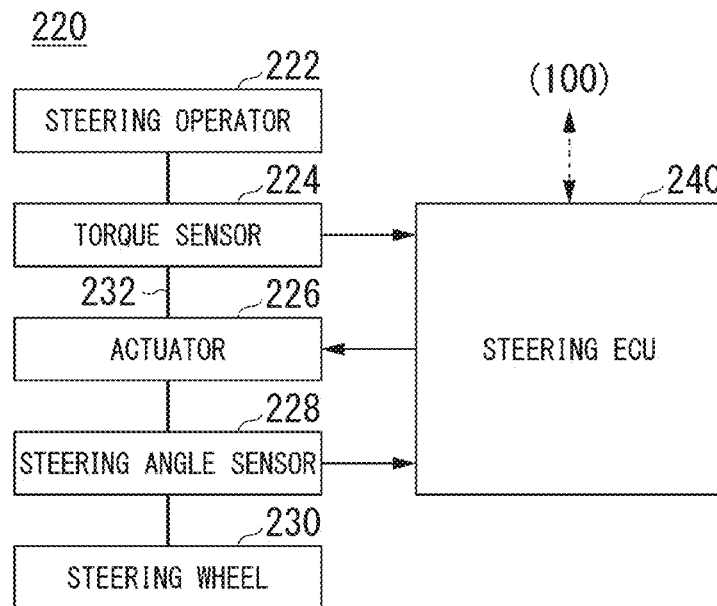
FIG. 2 is a configuration diagram of a steering device.

FIG. 2 is a configuration diagram of the steering device 220. The steering device 220 includes, for example, a steering operator 222, a torque sensor 224, an actuator 226, a steering angle sensor 228, and a steering wheel 230. These components are mechanically connected by a connection unit 232 which includes a steering shaft, gear mechanism, and the like. Note that the connection unit 232 may include a function of temporarily releasing a connection. The steering device 220 also includes a steering electronic control unit (ECU) 240. The steering device 220 may be a so-called steer-by-wire steering device in which the steering operator 222 and the steering wheel 230 are not mechanically connected.

The steering operator 222 is, for example, a steering wheel. Alternatively, the steering operator 222 may be a modified steer, a joystick, a lever, a D-pad, or another steering operator. In the following description, the steering operator 222 is assumed to be a steering wheel. The steering operator 222 transmits a torque (hereinafter referred to as a torque. When a steering operation is not a rotation operation, "force" in the present invention is not limited to a torque) to the connection unit 232 by being rotated. At least part of the connection unit 232 operates as a rotating shaft. The torque sensor 224 detects the torque applied to the steering operator 222 and outputs it to the steering ECU 240. The actuator 226 is, for example, a motor, and the stator is connected to a vehicle body and the rotor rotates together with the connection unit 232. The actuator 226 outputs a force to the connection unit in accordance with instructions from the steering ECU 240 to realize a so-called power steering function. When the actuator 226 outputs a torque to the connection unit 232, the torque is also transmitted to the steering operator 222. By outputting a minute torque from the actuator 226, vibration is transmitted to the hand of the driver of the vehicle M, and it is possible to give some awareness. In addition, the actuator 226 may operate to give a reaction force to the torque applied to the steering operator 222 and to suppress the steering operation. As a result, driving assistance such as a lane keeping assist system (LKAS) is realized. The actuator for realizing a power steering function and an actuator for outputting the reaction force may be provided separately, but herein they are expressed as one. The steering angle sensor 228 detects a rotation angle (a steering angle) of the steering wheel 230 and outputs it to the steering ECU 240. The steering ECU 240 causes the actuator 226 to operate according to instructions from the driving assistance device 100 on the basis of information input from the torque sensor 224 and the steering angle sensor 228.

Returning to FIG. 1, the driving assistance device 100 includes, for example, a recognition unit 110, a traffic participant behavior prediction unit 120, a trajectory prediction unit 130, a determination unit 140, an emergency stop control unit 150, and a guidance control unit 160. These components are implemented by a hardware processor such as a central processing unit (CPU) executing a program (software). In addition, some or all of these components may be realized by hardware (a circuit unit; including circuitry) such as large scale integration (LSI), an application specific integrated circuit (ASIC), a field-programmable gate array (FPGA), or a graphics processing unit (GPU), or may be realized by software and hardware in cooperation. A program may be stored in advance in a storage device (a storage device having a non-transitory storage medium) such as an HDD or flash memory of the driving assistance device 100, or may be stored in a detachable storage medium such as a DVD or a CD-ROM and may also be installed in an HDD or a flash memory of the driving assistance device 100 by the storage medium (a non-transitory storage medium) being attached to a drive device.

The recognition unit 110 recognizes the type, position, speed, acceleration, and the like of an object around the vehicle M on the basis of information input from the object detection device 10. The position of an object is recognized, for example, as a position on absolute coordinates with a representative point of the vehicle M (a center of gravity, a center of a drive shaft, or the like) as an origin, and used for control. The position of an object may be represented by a representative point such as the center of gravity or a corner of the object, or may be represented by a represented area. A "state" of an object may include an acceleration or jerk of the object, or a "behavioral state" (for example, whether it is changing lanes or about to change lanes). In this manner, the recognition unit 110 recognizes an object that the vehicle M should avoid contact with, which is present at least on the traveling direction side of the vehicle M.

In addition, the recognition unit 110 recognizes, for example, a lane in which the vehicle M is traveling (a traveling lane). For example, the recognition unit 110 recognizes the position and posture of the vehicle M with respect to the traveling lane. The recognition unit 110 may recognize, for example, a deviation of a reference point of the vehicle M from a center of the lane and an angle formed with a line connecting the center of the lane in the traveling direction of the vehicle M as a relative position and posture of the vehicle M with respect to the traveling lane. Instead, the recognition unit 110 may recognize a position of the reference point of the vehicle M with respect to any one of side edges (road division lines or road boundaries) of the traveling lane as the relative position of the vehicle M with respect to the traveling lane.

The traffic participant behavior prediction unit 120 predicts a future behavior of a subject (a traffic participant) who, among objects recognized by the recognition unit 110, is present on the traveling lane or on an adjacent lane adjacent to the traveling lane and moves by itself. Traffic participants include other vehicles, pedestrians, bicycles, and the like. For example, the traffic participant behavior prediction unit 120 may predict the future behavior of a traffic participant under a premise of a constant speed, a constant acceleration, and the like based on a movement history of the traffic participant in the past, or may predict the future behavior of the traffic participant using a method such as Kalman filter. In addition, the future behavior of the traffic participant may be predicted by considering a direction of the traffic participant (a direction of a vehicle body axis for a vehicle, a face direction for a pedestrian). A future behavior means, for example, the position of a traffic participant at a plurality of points in the future. Furthermore, the traffic participant behavior prediction unit 120 may set a risk that is an index value indicating a degree to which the vehicle M should not enter or approach on an assumed plane S that represents a space around the vehicle M using a two-dimensional plane viewed from above on the basis of the predicted future behavior of the traffic participant. In other words, the "risk" indicates a probability of presence of a target (not only a traffic participant but also a non-travelable area such as a road shoulder, a guardrail, and an area outside a white line) (It does not have to be the "probability" in a strict sense). A larger value of the risk indicates that the vehicle M should not enter or approach, and a value closer to zero indicates that it is preferable for the vehicle M to travel. However, this relationship may be reversed.

The traffic participant behavior prediction unit 120 sets the risks in the assumed plane S for each future time point defined at regular time intervals such as a current time t, after $\Delta t$ (a time $t+\Delta t$), after $2\Delta t$ (a time $t+2\Delta t$), and so on.

Figure 3:
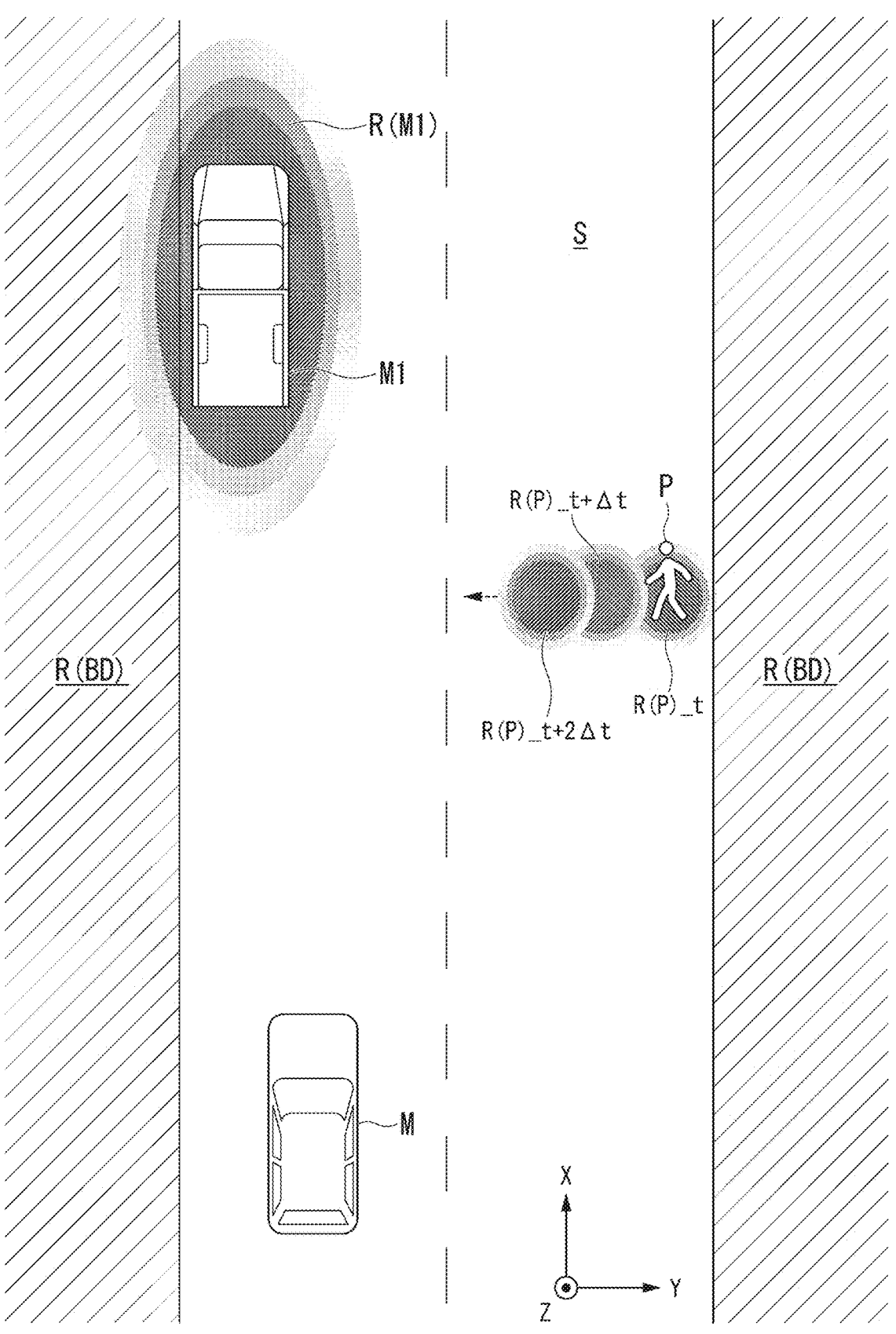
FIG. 3 is a diagram which shows an outline of risks set by a traffic participant behavior prediction unit.

FIG. 3 is a diagram which shows an outline of the risks set by the traffic participant behavior prediction unit 120. The traffic participant behavior prediction unit 120 sets risks for the traffic participant on the assumed plane S, with ellipses or circles as the contour lines based on the traveling direction and speed, and sets the risks of constant values for the non-travelable area. In FIG. 3, R(M1) is a risk of a stopped vehicle M1, and R(P) is a risk of a pedestrian P. Since the pedestrian P is moving in a direction of crossing a road, the risks are set at different positions from a current time for each time point in the future. The same will apply to moving vehicles, bicycles, and the like. R(BD) is a risk of the non-travelable area BD. In FIG. 3, a density of hatching indicates a value of the risk, and the risk increases as the hatching becomes darker. The traffic participant behavior prediction unit 120 may set a risk such that the value increases as moving further away from the center of the lane. The traffic participant behavior prediction unit 120 may simply predict the position of the traffic participant at a plurality of time points in the future without setting such risks.

The trajectory prediction unit 130 inputs a speed VM of the vehicle M detected by a vehicle speed sensor included in the vehicle sensor 40 and a steering angle $\theta M$ of the vehicle M detected by the steering angle sensor 228 of the steering device 220 to a vehicle body model (an arc model, a two-wheel model, or the like) to predict a trajectory of the vehicle M for a certain period of time in the future. Since various methods are known for the vehicle body model, detailed description will be omitted.

The determination unit 140 refers to a result of processing of the traffic participant behavior prediction unit 120 and the trajectory prediction unit 130, and determines whether it is difficult to avoid contact with an object recognized by the recognition unit 110 according to steering (steering avoidance). For example, when the time to collision (TTC) with an object is equal to or less than a threshold value, or when an avoidance trajectory capable of avoiding contact is generated and lateral acceleration during an avoidance behavior exceeds an upper limit, the determination unit 140 determines that steering avoidance is difficult. When it is determined that steering avoidance is difficult, the determination unit 140 activates the emergency stop control unit 150. In response to this, the emergency stop control unit 150 instructs the brake device 200 to stop the vehicle M.

When it is determined that steering avoidance is not difficult, the determination unit 140 determines to prompt the driver of the vehicle M to perform steering avoidance and determines a steering direction (in which direction the vehicle should be steered). The determination unit 140 may determine the steering direction on the basis of whether an object to be avoided is present on a left or a right side of the trajectory of the vehicle M predicted by the trajectory prediction unit 130, or may determine it by further considering which lateral position in the lane the vehicle M is moving. There are no particular restrictions on the method of determining the steering direction, and any method may be used to determine the steering direction.

When the determination unit 140 determines to prompt the driver to avoid contact with the object according to steering, the guidance control unit 160 performs guidance control to control the actuator 226 via the steering ECU 240 as follows.

Figure 4:
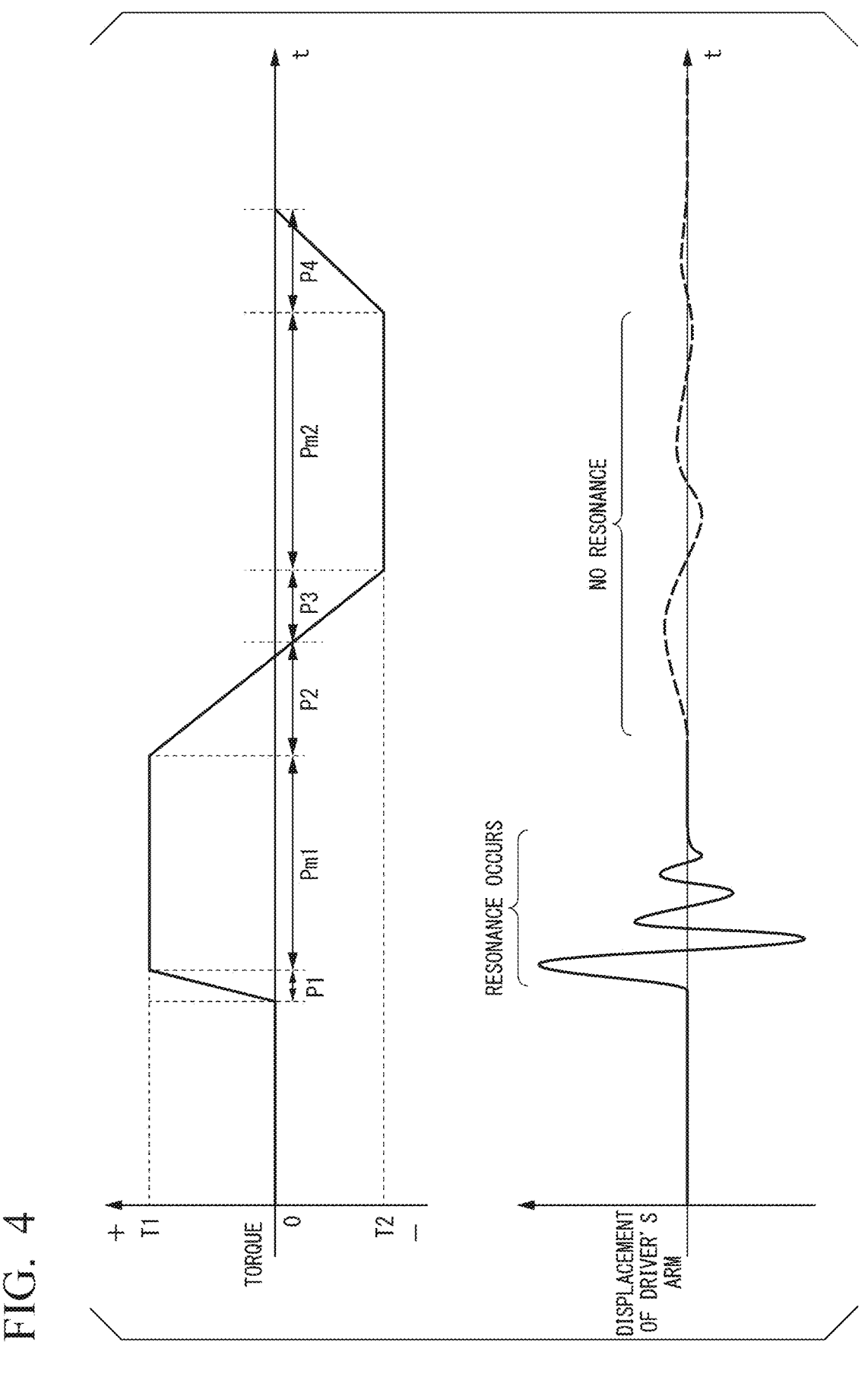
FIG. 4 is a diagram for describing control content of an actuator by a guidance control unit and an action given to a driver.

FIG. 4 is a diagram for describing control contents of the actuator 226 by the guidance control unit 160 and an action given to the driver. Among operation directions of the steering operator 222 in the following description, the same direction as the steering direction is set to be positive, and the opposite direction to the steering direction is set to be negative.

First, the guidance control unit 160 controls the actuator 226 to output a torque while gradually increasing the torque so as to reach the first target torque T1 in the same direction as the steering direction (that is, positive in FIG. 4) in a first period P1, and controls the actuator 226 such that the torque is maintained for the first maintenance period Pm1 when the torque reaches the first target torque T1.

The guidance control unit 160 then controls the actuator 226 so that the torque reaches zero in a second period P2 longer than the first period P1.

Next, the guidance control unit 160 controls the actuator 226 such that the torque reaches the second target torque T2 in the direction opposite to the steering direction in a third period P3, and controls the actuator 226 such that the torque is maintained for a second maintenance period Pm2 when the torque reaches the second target torque T2.

The guidance control unit 160 then controls the actuator 226 so that the torque is gradually weakened and the torque reaches zero in the fourth period P4.

Here, the first period P1 corresponds to, for example, a period corresponding to ¼ of a wavelength of 5 [Hz (hertz)]

(¼ of a reciprocal of 5 hertz) or less, and ¼ of a wavelength of 30 [Hz] (¼ of the reciprocal of 30 hertz) or longer. That is, the first period P1 is a period of 0.0083 [sec] or longer and 0.05 [sec] or less. Here, it has been found that a resonance frequency of an upper arm of a human is between 5 and 30 [Hz]. By setting the first period P1 as described above, a torque output in the first period P1 constitutes part of a wave motion of the resonance frequency of the upper arm of a human, so that it is assumed that a resonance can be generated in the arm of the driver.

On the other hand, the second period P2 is, for example, a period equal to or longer than a period corresponding to ¼ of a wavelength of 4 [Hz] (¼ of a reciprocal of 4 hertz). That is, the second period P2 is a period of 0.0675 [sec] or longer. Since a range of 4 [Hz] or less is out of the resonance frequency range of the upper arm of a human, it is assumed that the torque output in the second period P2 does not cause resonance in the arm of the driver.

Although FIG. 4 shows that a rate of change in torque is the same in the second period P2 and the third period P3, they may be different. The guidance control unit 160 may control, for example, the actuator 226 so that the rate of change in torque gradually slows down in the third period P3. Even in this case, it is desirable that the torque changes smoothly so that the torque does not have an inflection point during the second period P2 and the third period P3.

The fourth period P4 may be the same as or different from the first period P1. By making the fourth period P4 equal to the first period P1, there is a possibility that resonance will occur in the arm of the driver even in the fourth period P4 in which torque is missing. The fourth period P4 may be approximately the same period as the third period P3.

By doing this, it is possible to make the driver strongly conscious of the steering direction and less conscious of the opposite direction. The guidance control unit 160 may set a first target torque T1, a second target torque T2, and various periods described above so that an integral value of a positive torque and an integral value of a negative torque are equal. By doing this, it is possible to suppress unnecessary turning of the vehicle M under the guidance control, especially in a steering device in which the steering operator and the steering wheel are mechanically connected. As a result, it is possible to more effectively prompt the driver to perform steering avoidance while a feeling of manual driving is maintained. There is no particular restriction on a size relationship between the first target torque T1 and the second target torque T2. These may be the same value or may be different values.

If the steering device 220 is a steer-by-wire steering device, an output of a torque in the third period P3 and the fourth period P4 may be omitted. That is, the guidance control may end when the torque of the actuator 226 is made zero after the second period P2 has elapsed. This is because in a steer-by-wire steering device, even if a torque is output to the steering operator, it is possible to prevent the torque from being transmitted to the steering wheel.

According to the embodiment described above, it is possible to prompt the driver to perform steering avoidance more effectively by causing the actuator 226 to output, first, a force so that the first target torque T1 in the same direction as the steering direction is reached in the first period P1 to maintain the state, and causing the output force to reach zero in the second period P2, which is longer than P1.

The driving assistance device may not have an emergency stop processing unit, and may only perform avoidance trajectory generation and guidance control. In addition, the driving assistance device may also be configured as part of an automated driving control system (operating exclusively during manual driving).

Although a mode for carrying out the present invention has been described above using the embodiment, the present invention is not limited to the embodiment, and various modifications and substitutions can be made within a range not departing from the gist of the present invention.

What is claimed is:

1. A driving assistance device comprising:
a storage medium configured to store computer-readable instructions; and
a processor that is connected to the storage medium, wherein the processor executes the computer-readable instructions to:
determine to prompt a driver of a mobile object to avoid, via steering, contact with an object detected by an object detection device whose detection range is at least on a traveling direction side of the mobile object, and determine a rotation direction of a steering wheel for avoiding contact with the object; and
in response to a determination to prompt the driver of the mobile object to avoid contact with the object via steering, cause an actuator capable of outputting force to the steering wheel to:
output a force to reach a target force in a same direction as the rotation direction in a first period to maintain a present state while vibrating the steering wheel, wherein the first period is a period of ¼ or less of a reciprocal of 5 hertz and ¼ or more of a reciprocal of 30 hertz, and the first period is in a resonance frequency range of an upper arm of a human, and
at an end of the first period, cause the force to reach zero in a second period longer than the first period, wherein the second period is a period of ¼ or more of a reciprocal of 4 hertz.

2. The driving assistance device according to claim 1, wherein
a steering device mounted on the mobile object is a mechanical connection of the steering operator and the steering wheel,
the force is a first force,
the target force is a first target force, and
the processor causes the actuator to:
output a second force to reach a second target force in a direction opposite to the steering direction in a third period longer than the first period to maintain a present state after causing the first force output by the actuator in the second period to reach zero, and
at an end of the third period, cause the second force output to reach zero in a fourth period.

3. The driving assistance device according to claim 2, wherein the processor makes an integrated value of the first force output by the actuator in the same direction as the steering direction equal to an integrated value of the second force output by the actuator in a direction opposite to the steering direction.

4. The driving assistance device according to claim 2, wherein the fourth period is equal or substantially equal to the first period.

5. The driving assistance device according to claim 2, wherein a first rate of change of outputting the second force to reach the second target force in the third period is less than a second rate of change of causing the first force to reach zero in the second period.

6. A driving assistance method executed by a driving assistance device, comprising:
determining to prompt a driver of a mobile object to avoid, via steering, contact with an object detected by an object detection device having a detection range that is at least on a traveling direction side of the mobile object, and determining a rotation direction of a steering wheel for avoiding contact with the object; and
in response to the determining, causing an actuator capable of outputting a force to the steering wheel to execute:
outputting a force to reach a target force in a same direction as the rotation direction in a first period to maintain a present state while vibrating the steering wheel, wherein the first period is a period of ¼ or less of a reciprocal of 5 hertz and ¼ or more of a reciprocal of 30 hertz, and the first period is in a resonance frequency range of an upper arm of a human, and
at an end of the first period, causing the force to reach zero in a second period longer than the first period, wherein the second period is a period of ¼ or more of a reciprocal of 4 hertz.

7. A computer-readable non-transitory storage medium that has stored a program, in which the program causes a processor to execute
determining to prompt a driver of a mobile object to avoid contact, by steering, with an object detected by an object detection device with a detection range that is at least on a traveling direction side of the mobile object, and determining a rotation direction of the steering wheel for avoiding contact with the object; and
in response to the determining, causing an actuator capable of outputting a force to the steering wheel to execute:
outputting a force to reach a target force in a same direction as the rotation direction in a first period to maintain a present state while vibrating the steering wheel, wherein the first period is a period of ¼ or less of a reciprocal of 5 hertz and ¼ or more of a reciprocal of 30 hertz, and the first period is in a resonance frequency range of an upper arm of a human, and
at an end of the first period, causing the force to reach zero in a second period longer than the first period, wherein the second period is a period of ¼ or more of a reciprocal of 4 hertz.

* * * * *